US011592901B2

(12) United States Patent
Tang (10) Patent No.: US 11,592,901 B2
(45) Date of Patent: Feb. 28, 2023

(54) CONTROL DEVICE AND CONTROL METHOD FOR ROBOT ARM (71) Applicant: BOE TECHNOLOGY GROUP CO., LTD., Beijing (CN)

(72) Inventor: Jian Tang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 414 days.

(21) Appl. No.: 16/515,443

(22) Filed: Jul. 18, 2019

(65) Prior Publication Data
US 2020/0209963 A1 Jul. 2, 2020

(30) Foreign Application Priority Data

Jan. 2, 2019 (CN) .......................... 201910001058.0

(51) Int. Cl.
G05B 15/00 (2006.01)
G06F 3/01 (2006.01)
(Continued)

(52) U.S. Cl.
CPC ............ *G06F 3/014* (2013.01); *B25J 9/1602* (2013.01); *B25J 13/025* (2013.01); *G06F 3/015* (2013.01);
(Continued)

(58) Field of Classification Search
CPC .......... G06F 3/014; G06F 3/015; G06F 3/017; G06F 3/0346; B25J 9/1602; G05B 2219/35464; G05B 19/409
See application file for complete search history.

(56) References Cited

U.S. PATENT DOCUMENTS 9,104,271 B1* 8/2015 Adams .................... G06F 3/014
2013/0317648 A1* 11/2013 Assad ..................... G06F 3/014
700/258

(Continued)

FOREIGN PATENT DOCUMENTS

CN 102436769 A 5/2012
CN 106445168 A * 2/2017
(Continued)

OTHER PUBLICATIONS

First Office Action for CN Appl. No. 201910001058.0, dated Oct. 30, 2019.

*Primary Examiner* — Abby Y Lin
*Assistant Examiner* — Sohanatanju Khayer
(74) *Attorney, Agent, or Firm* — The Webb Law Firm (57) ABSTRACT A control device for robot arm is provided that comprises: an elastic member comprising a palm portion and a finger portion, the palm portion being coupled to the finger portion, the elastic member being adapted to receive a part of body of a user; a detecting electrode located on an inner surface of the palm portion and configured to detect a surface electromyogram signal of the part of body for identifying a gesture of the part of body of the user; a sensor located on the elastic member for acquiring data relating to a three-dimensional motion of the part of body of the user to identify the three-dimensional motion of the part of body of the user, wherein the surface electromyogram signal and the data relating the three-dimensional motion are adaptable to be used to control the robot arm to perform the gesture and the three-dimensional motion.

11 Claims, 5 Drawing Sheets (51) Int. Cl.
*B25J 9/16* (2006.01)
*G06F 3/0346* (2013.01)
*B25J 13/02* (2006.01)
*G05B 19/409* (2006.01)

(52) U.S. Cl.
CPC ............. *G06F 3/016* (2013.01); *G06F 3/017* (2013.01); *G06F 3/0346* (2013.01); *G05B 19/409* (2013.01); *G05B 2219/35464* (2013.01)

(56) References Cited

U.S. PATENT DOCUMENTS

| | | | |
|---|---|---|---|
| 2017/0042704 A1* | 2/2017 | Ryu | A61H 1/0288 |
| 2017/0249561 A1* | 8/2017 | Abdallah | G06N 20/00 |
| 2017/0259428 A1* | 9/2017 | Assad | G16H 40/67 |
| 2018/0250830 A1* | 9/2018 | Hashimoto | B23P 19/04 |
| 2018/0311570 A1* | 11/2018 | Buchanan | A63F 13/24 |
| 2019/0220099 A1* | 7/2019 | Baranski | A61B 5/389 |
| 2020/0142490 A1* | 5/2020 | Xiong | G06F 3/011 |

FOREIGN PATENT DOCUMENTS

| | | | |
|---|---|---|---|
| CN | 106527738 A | * | 3/2017 |
| CN | 206955477 U | | 2/2018 |
| CN | 108037821 A | * | 5/2018 |

* cited by examiner

CONTROL DEVICE AND CONTROL METHOD FOR ROBOT ARM

CROSS-REFERENCE TO RELATED APPLICATIONS

The present application claims priority to the Chinese Patent Application No. 201910001058.0, filed on Jan. 2, 2019, which is incorporated herein in its entirety by reference.

FIELD

The present disclosure relates to the field of robot arm (or, manipulator) technology, and in particular, to a control method and a control device for robot arm.

BACKGROUND

Robot arms have been widely used in various fields such as industry, intelligence, and medical care, and have played an important role in improving people's quality of life. Improving of the operation intelligentization and good human-computer interaction of robot arm has become an important issue of development. The development of modern signal measurement and processing technology and bio-mechanical-electro integration technology makes it possible to directly or indirectly control the robot art with human body through human biological signals and other auxiliary signals. The development of these technologies provides a practical way for intelligent control of robot arms.

Surface electromyography (SEMG) is a weak bioelectrical signal generated on the skin surface accompanying the contraction of human skeletal muscle. Different surface EMG signals can reflect the muscle activities corresponding to various human motions to some extent.

Conventionally, user's gesture can be recognized by collecting the surface electromyogram signal of the user's arm with a wristband, however user's gesture may be not accurately recognized with the wristband.

SUMMARY

According to an aspect of the present disclosure, there is provided a control device for robot arm comprising: an elastic member comprising a palm portion and a finger portion, the palm portion being coupled to the finger portion, the elastic member being adapted to receive a part of body of a user; a detecting electrode located on an inner surface of the palm portion and configured to detect a surface electromyogram signal of the part of body for identifying a gesture of the part of body of the user; a sensor located on the elastic member for acquiring data relating to a three-dimensional motion of the part of body of the user to identify the three-dimensional motion of the part of body of the user, wherein the surface electromyogram signal and the data relating the three-dimensional motion are adaptable to be used to control the robot arm to perform the gesture and the three-dimensional motion.

In some embodiments, the control device for robot arm further comprises: an adjustment device located at a side portion of the palm portion for adjusting the elastic member according to a size of the part of body of the user.

In some embodiments, the adjustment device is an elastic band.

In some embodiments, the detecting electrode is located on an inner surface of the side portion of the palm portion and in correspondence to a position of the adjustment device.

In some embodiments, the elastic member is an inflatable component comprising an inflating device and a pressure detecting device; wherein the pressure detecting device is configured to detect pressure data of a gas in the inflatable component; and wherein the inflating device is configured to control charging and discharging the gas according to the pressure data to adjust the size of the inflatable component.

In some embodiments, the control device for robot arm further comprises: a force feedback device located on the elastic member for applying a force feedback to the elastic member based on information of a force received by the robot arm.

In some embodiments, the control device for robot arm further comprises: a communication device electrically connected to the detecting electrode, the sensor, and the force feedback device, respectively.

In some embodiments, the control device for robot arm further comprises: a fingerprint sensor located at a position corresponding to finger pulp of the finger portion and located at an inner surface of the finger portion.

In some embodiments, the data relating to the three-dimensional motion includes acceleration data and angular velocity data; and the sensor includes an accelerometer and a gyroscope; wherein the accelerometer is configured to detect acceleration data of the part of body of the user; and wherein the gyroscope is configured to detect angular velocity data of the part of body.

In some embodiments, the elastic member is an elastic glove, the part of body comprises the user's hand, the gesture is a gesture of the user's hand.

In some embodiments, the detecting electrode is located on an inner surface of a side portion of the elastic glove, which corresponds to a back side of the hand, and is located in correspondence to a position of the adjustment device.

According to an aspect of the present disclosure, there is provided a method of controlling a robot arm, which is implemented by the control device for robot arm according to any of the embodiments of the present disclosure, comprising: detecting, with the detecting electrode, surface electromyogram signals of a user's hand to identify gestures of the user's hand; and acquiring, with the sensor, data relating to three-dimensional motion of the user's hand to identify a three-dimensional motion of the user's hand, the surface electromyogram signals and the data relating to the three-dimensional motion being configured to control the robot arm to perform the gestures and the three-dimensional motion; wherein the gestures include at least two groups of gestures, the at least two groups of gestures are used to respectively control at least two robot arms, and fingers that respectively correspond to the at least two groups of gestures are different from each other.

The above general description and the following detailed description are intended to be exemplary and illustrative, and not for limiting the scope of the present disclosure.

BRIEF DESCRIPTION OF THE DRAWINGS

The accompanying drawings, which are incorporated in and constitute a part of the specification, illustrate some embodiments of the present disclosure, and together with the descriptions are used to explain the principles of the present disclosure.

DETAILED DESCRIPTION OF EXEMPLARY EMBODIMENTS

Exemplary embodiments will be described in detail hereinafter, and some examples thereof are illustrated in the accompanying drawings. In the following descriptions, when referring to the drawings, the same numbers are used in different figures to indicate the same or similar elements unless otherwise indicated. The embodiments described in the following exemplary embodiments do not represent all embodiments consistent with the present disclosure. Instead, they are merely examples of devices and methods consistent with some aspects of the present disclosure as defined in the appended claims.

According to an aspect of the present disclosure, a control device for robot arm is provided. The control device can include an elastic member including a palm portion and a finger portion, the palm portion being coupled to the finger portion, the elastic member being adapted to receive a part of body of a user. The control device may further include a detecting electrode 505 on an inner surface of the palm portion for detecting a surface electromyogram signal of the part of body for identifying a gesture of the part of body of the user. The control device may further include a sensor 507 located on the elastic member for acquiring data related to three-dimensional motion of the part of body of the user to identify three-dimensional motion of the part of body of the user. The surface electromyogram signal and data related to the three dimensional motion can be used to control the robot arm to perform the gesture and the three dimensional motion.

Figure 1:
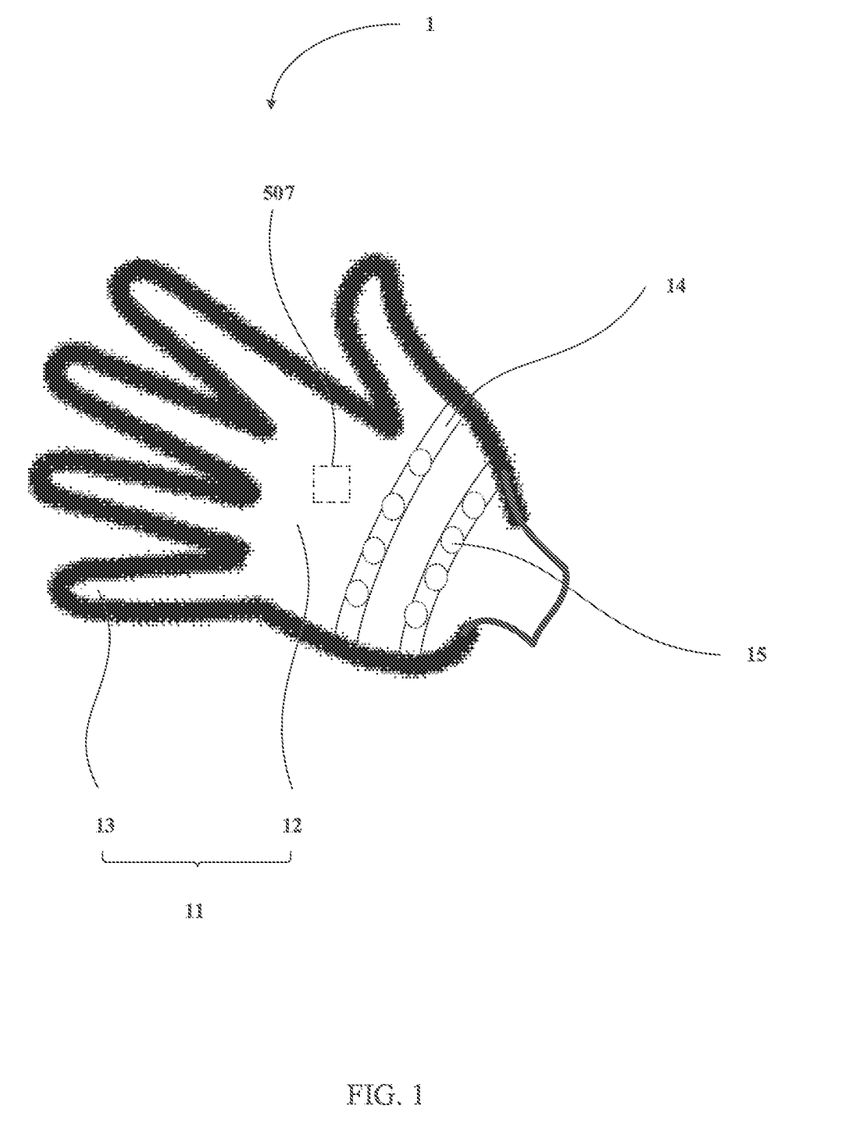
FIG. 1 is a schematic view of a control device for robot arm according to an embodiment of the present disclosure.

In some embodiments, the elastic member 501 can be an elastic glove 11 as shown in FIG. 1, the partial body may comprise user's hand(s), and the gesture can be a gesture of the user's hand(s).

FIG. 1 illustrates a control device 1 for robot arm in accordance with an embodiment of the present disclosure. The control device 1 for robot arm includes: an elastic glove 11, a detecting electrode 15, and a sensor 507.

As shown in FIG. 1, the elastic glove 11 includes a palm portion 12 and a finger portion 13. The palm portion 12 is coupled to the finger portion 12. The detecting electrode 15 is located on an inner surface of the palm portion 12 for detecting a surface electromyogram signal to identify user's gesture. The sensor 507 is located on the elastic glove 11 for detecting data related to three-dimensional motion of the user's hand, such as three-dimensional motion posture data, to identify the postures of three-dimensional motion of the user's hand. The surface electromyogram signal and the three-dimensional motion posture data can be used to control the robot arm to perform (e.g., reproduce) the gesture and the posture of three-dimensional motion.

In the embodiment of the present disclosure, the elastic glove includes the palm portion and the finger portion which are coupled, and the detecting electrode is located on the inner surface of the palm portion. When the user wears the elastic glove on the hand, the detecting electrode can be in close contact with the user's hand. Moreover, the detecting electrode is closer to the user's finger, and the user's gesture can be accurately detected by detecting the surface electromyogram signal. Further, since the sensor is located on the elastic glove and close to the user's hand, the postures of three-dimensional motion of the user's hand can be accurately detected. Further, the robot arm can be precisely controlled according to the user's gesture and the postures of the three-dimensional motion of the user's hand. In summary, according to the embodiment of the present disclosure, the user's gesture and the three-dimensional motion of the user's hand can be accurately detected, and the robot arm can be accurately controlled.

The elastic glove can have a function of automatically adaptively shrinking to adapt to different users. Thus, the cost for the molds for the elastic glove can be reduced, and the applicability of the device can be improved.

In an embodiment, the data relating to three-dimensional motion may include acceleration data and angular velocity data. The sensor can include an accelerometer and a gyroscope. The accelerometer is used to detect acceleration data of the user's hand to calculate linear motion data of the user's hand in three-dimensional space. The gyroscope is used to detect angular velocity data of the hand to calculate the rotation or roll data of the user's hand in the three-dimensional space.

As shown in FIG. 1, in an embodiment, the elastic glove 11 can also include an adjustment device 14. The adjustment device 14 can be located on a part of the palm portion 12 corresponding to the back of the hand, for adjusting the size of the elastic glove 11 according to the size of the user's hand. In this way, the size of the elastic glove 11 can be adjusted according to the size of the user's hand so that the side of the palm portion 12 corresponding to the back of the user's hand is closely attached to the back of the user's hand, which is advantageous for improving the accuracy of detecting the surface electromyogram signal, and thus, the user's gesture can be accurately detected.

As shown in FIG. 1, in an embodiment, the detecting electrode 15 can be located on an inner surface of the back part of the palm portion and corresponding to the position of the adjustment device 14. In such a way, the adjustment device 14 is positioned on the back side of the palm portion, which is corresponding to the back of the hand, closer to the back of the user' hand than the other positions, it is more advantageous to make the back part of the palm portion 12 closely fit the back of the user's hand, thereby further improving the accuracy of detecting the surface electromyogram signal. And, the user's gesture can be detected more accurately.

In an embodiment, the adjustment device 14 can be an elastic band that is easy to manufacture and can reduce costs. In an embodiment, a plurality of the detecting electrodes 15 may be provided, and two or more elastic bands may be provided. The two elastic bands can be configured parallel to each other, and the detecting electrodes 15 corresponding to respective elastic band may be evenly distributed along the corresponding elastic bands. In such a way, it is more advantageous to make the back side of the palm portion 12 closely fit the back of the user's hand, further improving the accuracy of detecting the surface electromyogram signal. Thus, the user's gesture can be further accurately detected.

In another embodiment, the elastic glove can be an inflatable glove. The inflatable glove may include an inflating device 5011 and a pressure detecting device 5013. The pressure detecting device 5013 is configured to detect pressure of a gas in the inflatable glove. The inflating device 5011 is configured to control charging and discharging of gas according to the pressure data to adjust the size of the inflatable glove. For example, the elastic gloves may have a sandwich structure with gas interposed in the sandwich structure. The pressure detecting device 5013 is disposed in the sandwich structure. When the pressure detecting device 5013 determines that the gas pressure is less than a preset pressure value, the inflating device 5011 fills the sandwich structure with gas until the gas pressure reaches the preset pressure value. When the pressure detecting device 5013 determines that the gas pressure is larger than the preset pressure value, the inflating device 5011 controls the sandwich structure to release the gas until the gas pressure is lowered to the preset pressure value. When the gas pressure in the sandwich structure is at the preset pressure value, the size of the inflatable glove can match the size of the user's hand, and the elastic glove 14 can be in close contact with the user's hand. Thereby the accuracy of the detection of the surface electromyogram signal can be improved, and the user's gestures can be further accurately detected.

In an embodiment, the robot arm control device 1 may also include a force feedback device 509. The force feedback device 509 may be located on the elastic glove 11 for applying a force to the elastic glove 11 according to the information of the force received by the robot arm. In such a way, the user can feel the force received by the robot arm, so that the user can adjust the gesture(s) and the three-dimensional motion posture(s) according to the force received by the robot arm, thereby adjusting the gesture(s) and the three-dimensional motion posture(s) performed by the robot arm, enhancing the interaction experience during the user operation.

In an embodiment, a torque sensor is mounted on the robot arm for collecting information of the force received by the robot arm and transmitting it to the force feedback device 509. The torque sensor can collect the force information of the robot arm in real time and send it to the force feedback device 509, so that the user can feel the force received by the robot arm in time. The user can adjust the gesture(s) and the three-dimensional motion posture(s) according to the force received by the robot arm in time, and finally adjust the gestures and three-dimensional motion postures performed by the robot arm in time. Of course, other sensors can be installed on the robot arm for collecting the force information of the robot arm, and are not limited to the above-mentioned torque sensor.

In an embodiment, the control device 1 of the robot arm may further comprise a communication device 511. The communication device 511 can be electrically connected to the detecting electrode 15, the sensor(s), and the force feedback device, respectively. The communication device 511 can transmit the surface electromyogram signal detected by the detecting electrode 15 and the three-dimensional motion posture data of the user's hand detected by the sensor to a robot arm communicatively connected to the robot arm control device 1, and can also receive the force information of the robot arm from the robot arm hand and output it to the force feedback device.

In an embodiment, the communication device 511 can comprise a Bluetooth communication module, an infrared communication module, a wireless serial communication module, or the like.

In an embodiment, the robot arm control device 1 can communicate with the robot arm through a computer. In this embodiment, the robot arm control device 1 can analyze the surface electromyogram signal detected by the detecting electrode 15 and the three-dimensional motion posture data detected by the sensor to obtain the information of the three-dimensional motion posture and the gesture. And then, the information of the three-dimensional motion posture and the gesture is sent to a computer for the computer to control the robot arm. Of course, alternatively, the robot arm control device 1 can also transmit the surface electromyogram signal detected by the detecting electrode 15 and the three-dimensional motion posture data detected by the sensor to a computer, and the surface electromyogram signal and the three-dimensional motion posture data can be analyzed by the computer to obtain the gesture(s) and the information of the three-dimensional motion posture(s) to control the robot arm. Of course, the present disclosure shall not be limited to the above embodiments.

In another embodiment, the robot arm's control device 1 can also communicate directly with the robot arm. In this embodiment, the robot arm control device 1 can analyze the surface electromyogram signal detected by the detecting electrode 15 and the three-dimensional motion posture data detected by the sensor to obtain the information of the gesture(s) and the three-dimensional motion posture(s). And then, the gesture(s) and the information of the three-dimensional motion posture(s) are sent to the robot arm to control the robot arm. Alternatively, the robot arm control device 1 can also transmit the surface electromyogram signal detected by the detecting electrode 15 and the three-dimensional motion posture data detected by the sensor to the robot arm, and the surface electromyogram signal and the three-dimensional motion posture data can be analyzed by the robot arm to obtain the gesture(s) and the information of the three-dimensional motion posture(s) for controlling the robot arm.

Figure 2:
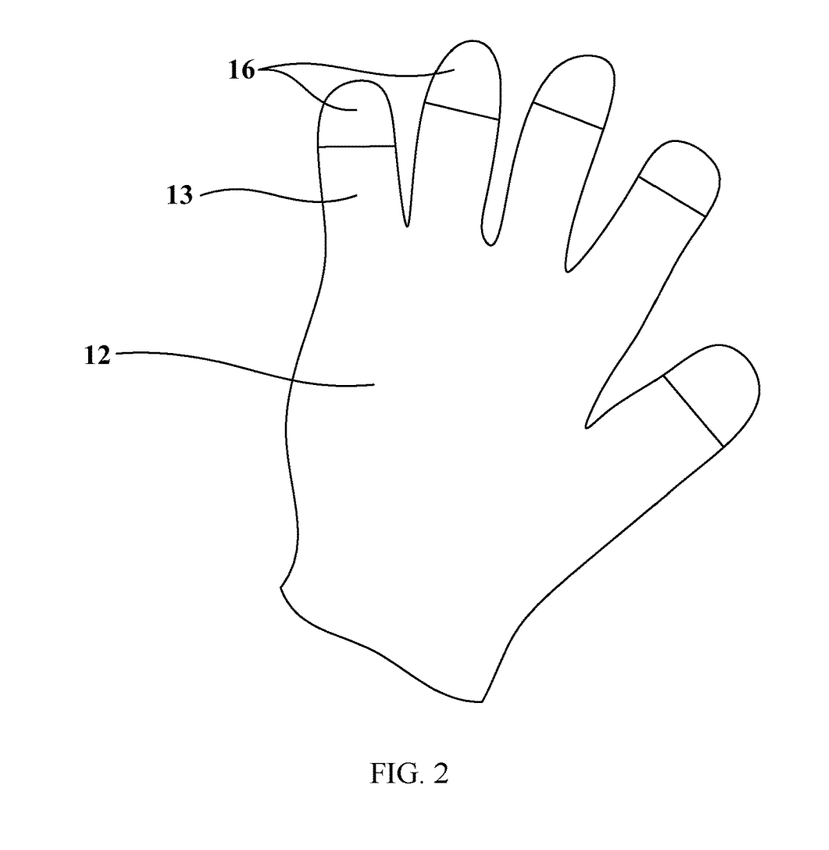
FIG. 2 is a schematic view of a control device for robot arm according to an embodiment of the present disclosure.

In an embodiment, as shown in FIG. 2, the robot arm control device 1 may further include a fingerprint sensor 513. The fingerprint sensor 513 can be located at the finger pulp position 16 of the finger portion 13 and located on the inner surface of the finger portion 13. The fingerprint sensor 513 is configured to collect fingerprint information of the user. When the collected fingerprint information matches the pre-stored reference fingerprint information, the detecting electrode and the sensor are activated. When the collected fingerprint information fails to match the pre-stored reference fingerprint information, the detecting electrode and the sensor fingerprint are prohibited from operating.

In an embodiment, the fingerprint sensor 513 can be electrically coupled to the communication device 511 when the robot arm control device 1 communicates with the robot arm through a computer. The fingerprint sensor 513 may send the collected fingerprint information of the user to the computer through the communication device 511, and the computer determines whether the collected fingerprint information matches the pre-stored reference fingerprint information. When they are matched, the computer can activate the detecting electrode and the sensor to operate. When they are not matched, the computer can disable the detecting electrode and the sensor from working.

In an embodiment, the gestures can include at least two groups of gestures. The at least two groups of gestures can be respectively used to control at least two robot arms respectively. The fingers corresponding the at least two groups of gestures can be different from each other. For example, in the control device of the robot arm, the finger portion of the elastic glove may include finger sleeves for five fingers, such as, sleeves for a thumb, an index finger, a middle finger, a ring finger, and a little finger. The robot arm control device can detect the motions of five fingers. The actions of the thumb, the index finger and the middle finger can be used to form a set of gestures for controlling the action of a robot arm 1, the ring finger and the little finger can be used to form another set of gestures for controlling a robot arm 2. In such a way, a robot arm control device can be used to control different robot arms, which improves resource utilization and release another hand of the user.

In some embodiments, the control device may further include: a processor 515 configured to receive the surface electromyogram signal and the data related to the three-dimensional motion, and provide control signal(s) to the robot arm to control the robot arm to perform the gesture and the three-dimensional motion. The processor 515 may comprise a central processing unit CPU, a digital signal processor DSP, a microcontroller MCU, an application specific integrated circuit ASIC, a programmable logic gate array FPGA, etc. In some embodiments, the processor 515 may be configured to run a computer program to implement the above functions. The computer program can be stored in a memory that may comprise volatile memory and/or non-volatile memory. The volatile memory may comprise, for example, a random access memory (RAM) and/or a cache or the like. The non-volatile memory may comprise, for example, a read only memory (ROM), a hard disk, a flash memory, or the like.

Figure 3:
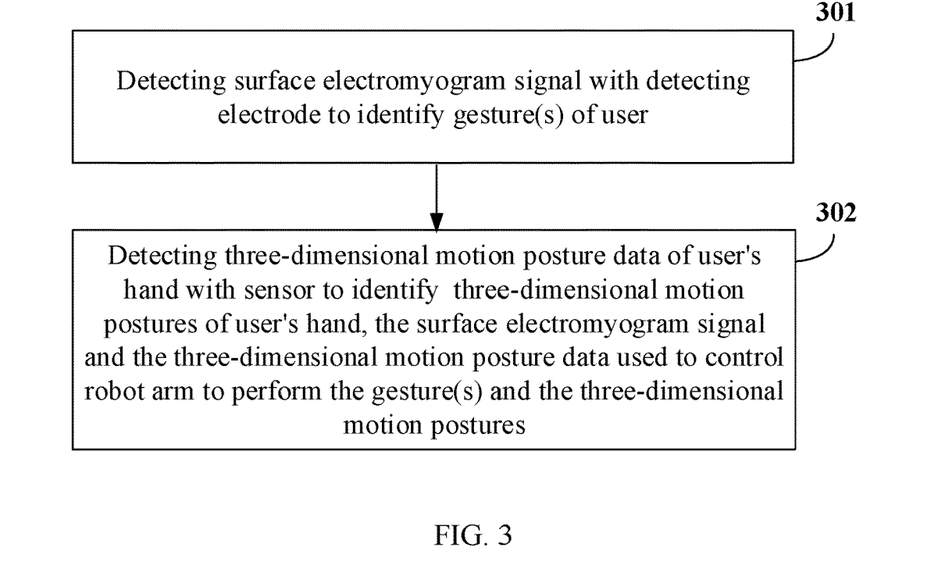
FIG. 3 is a flow chart showing a method of controlling a robot arm according to an embodiment of the present disclosure.

According to an embodiment of the present disclosure, there is also provided a control method for robot arm, which can be applied to the robot arm control device as described in any of the above embodiments. As shown in FIG. 3, the robot arm control method may include the following steps 301-302.

In step 301, surface electromyogram signal is detected by the detecting electrode to identify gesture(s) of the user.

In step 302, three-dimensional motion posture data of the user's hand is detected by the sensor to identify postures of a three-dimensional motion of the user's hand. The surface electromyogram signal and the three-dimensional motion posture data are used to control the robot arm to perform the gesture(s) and the three-dimensional motion postures.

The gestures may include at least two groups of gestures. The at least two groups of gestures are respectively used to control at least two corresponding robot arms. The fingers corresponding the at least two groups of gestures can be different from each other.

In the embodiments, since the elastic glove includes the palm portion and the finger portion which are coupled, and the detecting electrode is located on the inner surface of the palm portion, when the user wears the elastic glove on his/her hand, the detecting electrode and the user's hand can be in close contact. Moreover, the detecting electrode is closer to the user's fingers, and the user's gesture can be accurately detected by detecting the surface electromyogram signal. Moreover, since the sensor is located on the elastic glove in a close distance to the user's hand, the three-dimensional motion postures of the user's hand can be accurately detected. Further, the robot arm can be precisely controlled according to the precise user's gesture and the precise three-dimensional motion postures of the user's hand. In summary, according to the embodiment of the present disclosure, the gestures of the user' hand and the three-dimensional motion postures of the user's hand can be accurately detected, and the robot arm can be accurately controlled.

Moreover, the elastic gloves have an automatically adaptively shrinking function, which can adapt to different users. Thus, the cost of the molding can be reduced, and the applicability of the device can be improved.

Further, a robot arm control device can be used to control different robot arms, which improves resource utilization and releases another hand of the user.

Figure 4:
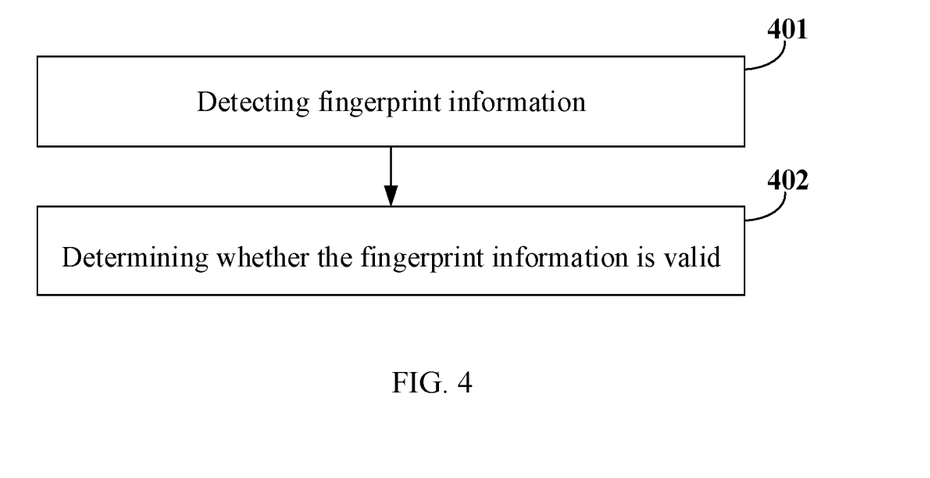
FIG. 4 is a flow chart of a method of controlling a robot arm according to another embodiment of the present disclosure.
Figure 5:
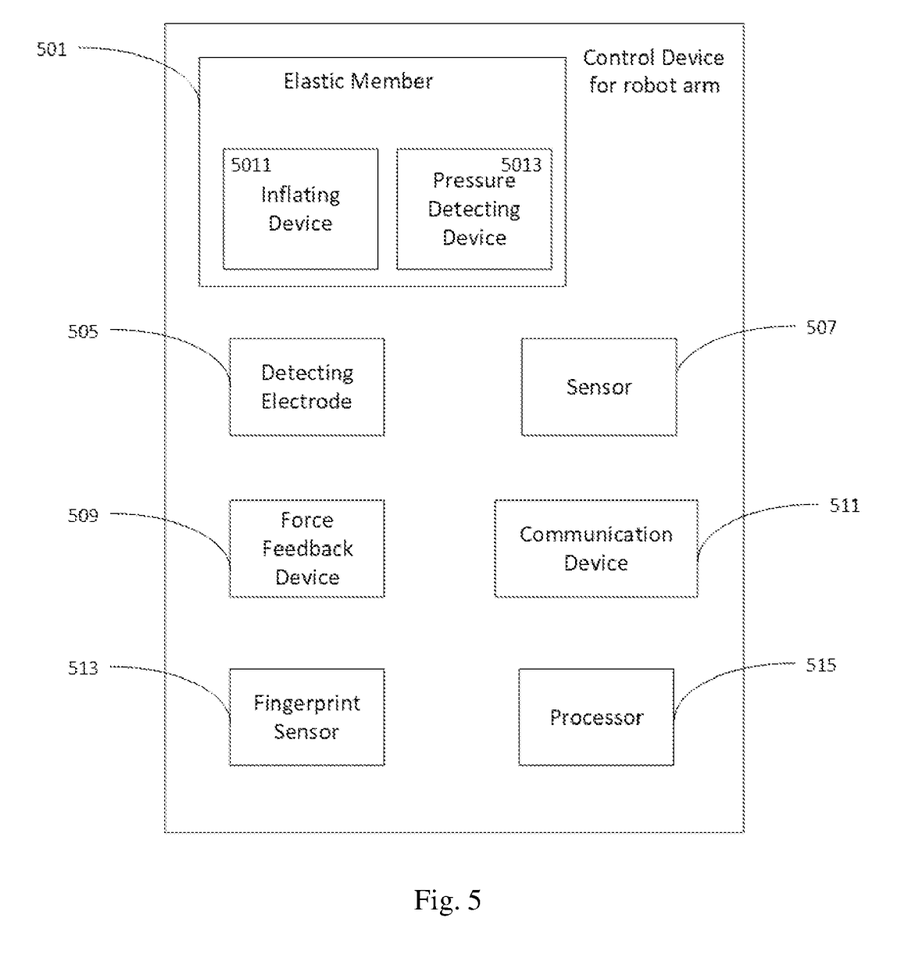
FIG. 5 shows a block diagram of a control device for robot arm according to the embodiments of the present disclosure.
Figure 6:
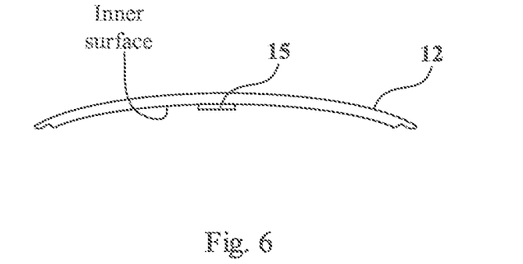
FIG. 6 is a schematic view of a detecting electrode located on an inner surface of a palm portion according to an embodiment of the present disclosure.

In an embodiment, as shown in FIG. 4, before step 301, the method may further include the following steps 401-402.

In step 401, fingerprint information is detected. In this step, the fingerprint information of the user can be collected through the fingerprint sensor as described above.

In step 402, it is determined whether the fingerprint information is valid. In this step, the collected fingerprint information can be matched with pre-stored reference fingerprint information. When the collected fingerprint information matches the pre-stored reference fingerprint information, the detecting electrode and the sensor may be activated. When the collected fingerprint information fails to match the pre-stored reference fingerprint information, the detecting electrode and the sensor may be prohibited from working.

In an embodiment, the control method for robot arm may further include: receiving information on the force received by the robot arm, and applying a force to the elastic glove according to the information on the force received by the robot arm. In such a way, the user can feel the force received by the robot arm so that the user can adjust the gesture(s) and the three-dimensional motion posture(s) according to the force received by the robot arm, thereby adjusting the gesture and the three-dimensional motion posture performed by the robot arm. Thereby the interaction experience during the user operation can be enhanced.

According to the embodiments of the present disclosure, when the user uses the control device of the embodiments of the present disclosure, the detecting electrode can be in close contact with the user's hand. In addition, the detecting electrode is positioned closer to the user's fingers, and user's gestures can be accurately detected by detecting the surface electromyogram signal. Moreover, since the sensor for detecting postures is located on the elastic glove and in a close distance to the user's hand, the three-dimensional motion postures of the user's hand can be accurately detected. Further, the robot arm can be precisely controlled according to the precise user's gesture and the precise three-dimensional motion postures of the user's hand. In summary, according to the embodiments of the present disclosure, the gestures and the three-dimensional motion posture of the user's hand can be accurately detected, and the robot arm can be accurately controlled.

It is to be noted that the dimensions of layers and regions in the drawings may be exaggerated for clarity of illustration. It is also to be understood that when an element or layer is referred to as being "on" another element or layer, it may be directly on the other element or an intermediate layer may be present therebetween. Similarly, it is to be understood that when an element or layer is referred to as being "under" another element or layer, it may be directly under the other element or there may be one or more intermediate layers or elements therebetween. In addition, it is also to be understood that when a layer or element is referred to as being "between" two layers or elements, it can be an only layer between the two layers or elements, or there could be one or more intermediate layer or element therebetween. Like reference numerals are used to indicate like elements throughout the specification and drawings.

In the present disclosure, the terms "first", "second", and the like are used for descriptive purposes only, and shall not be construed as indicating or implying any priority. The term "plurality" refers to two or more, unless specifically defined otherwise.

Other embodiments of the present disclosure will be readily apparent to those skilled when viewing or practicing the present disclosure. Any variations, uses, or adaptations of the present disclosure, which are in accordance with the general principles of the present disclosure and may include common general knowledge or conventional technical means in the art that is/are not disclosed in the present disclosure, are intended to be embraced by the scope of the present disclosure. The specification and embodiments are provided for illustrative purpose only, and the scope and spirit of the present disclose are defined by the appended claims.

It is to be understood that the present disclosure shall not be limited to the precise details as described above and illustrated in the drawings, and thus various modifications and variants can be made without departing from the scope of the present disclosure. The scope of the present disclosure is to be define by the appended claims only.

What is claimed is:

1. A control device for a robot arm comprising:
   an elastic member comprising a palm portion and a finger portion, the palm portion being coupled to the finger portion, the elastic member being adapted to receive a part of body of a user;
   a detecting electrode located on an inner surface of the palm portion and for detecting one or more or more surface electromyogram signals of the part of body for identifying a gesture of the part of body of the user;
   an adjustment device located at a part of the palm portion for adjusting the elastic member according to a size of the part of body of the user; and
   a processor configured to receive the one or more surface electromyogram signals for identifying the gesture of the part of body of the user and data relating to a three-dimensional motion for identifying a three-dimensional motion of the part of body of the user and provide, on bases of the one or more surface electromyogram signals and the data relating to the three-dimensional motion, control signal(s) to the robot arm to control the robot arm to perform the gesture and the three-dimensional motion,
   wherein the detecting electrode is located in a position, which is in correspondence to and at least partially overlaps with the adjustment device, on the inner surface of the palm portion.

2. The control device for the robot arm according to claim 1, wherein the adjustment device is an elastic band.

3. The control device for the robot arm according to claim 1, wherein the elastic member is an inflatable component comprising a pressure detecting device for detecting pressure data of a gas in the inflatable component; and
   wherein the size of the inflatable component is capable of being controlled according to the pressure data.

4. The control device for the robot arm according to claim 1, further comprising:
   a force feedback device located on the elastic member for applying a force feedback to the elastic member based on information of a force received by the robot arm.

5. The control device for the robot arm according to claim 4, further comprising:
   a communication device electrically connected to the detecting electrode, the sensor, and the force feedback device, respectively.

6. The control device for the robot arm according to claim 1, further comprising:
   a fingerprint sensor located at a position corresponding to finger pulp of the finger portion and located at an inner surface of the finger portion.

7. The control device for the robot arm according to claim 1, wherein the data relating to the three-dimensional motion includes acceleration data and angular velocity data.

8. The control device for the robot arm according to claim 1, wherein:
   the elastic member is an elastic glove, the part of body comprises a hand of the user, the gesture is of the hand.

9. The control device for the robot arm according to claim 8, wherein:
   the detecting electrode is located on an inner surface of a side portion of the elastic glove, which corresponds to a back side of the hand, and is located in correspondence to a position of an adjustment device.

10. A method of controlling one or more robot arms, comprising:
    providing a control device comprising:
    an elastic member comprising a palm portion and a finger portion, the palm portion being coupled to the finger portion, the elastic member being adapted to receive at least a part of a hand of a user;
    a detecting electrode located on an inner surface of the palm portion;
    an adjustment device located at a part of the palm portion for adjusting the elastic member according to a size of the hand of the user; and
    a processor configured to receive one or more surface electromyogram signals for identifying the gesture of the part of body of the user and data relating to a three-dimensional motion for identifying a three-dimensional motion of the part of body of the user and provide, on bases of the one or more surface electromyogram signals and the data relating to the three-dimensional motion, control signal(s) to the one or more robot arms to control the one or more robot arms to perform the gesture and the three-dimensional motion, wherein the detecting electrode is located in a position, which is in correspondence to and at least partially overlaps with the adjustment device, on the inner surface of the palm portion;
    detecting, with the detecting electrode of the control device, the one or more surface electromyogram signals of a hand of a user to identify gestures of the hand;
    acquiring data relating to a three-dimensional motion of the hand to identify the three-dimensional motion of the hand; and
    providing a control signal, on the bases of the one or more surface electromyogram signals and the data relating to the three-dimensional motion, being configured to control the one or more robot arms to perform the gestures and the three-dimensional motion.

11. The method according to claim 10, wherein the gestures include at least two groups of gestures, the at least two groups of gestures are used to respectively control at least two robot arms, and fingers of the hand for the respective groups of gestures are different from each other.

* * * * *

UNITED STATES PATENT AND TRADEMARK OFFICE
CERTIFICATE OF CORRECTION

PATENT NO. : 11,592,901 B2
APPLICATION NO. : 16/515443
DATED : February 28, 2023
INVENTOR(S) : Jian Tang It is certified that error appears in the above-identified patent and that said Letters Patent is hereby corrected as shown below:

In the Claims

Column 9, Line 34, Claim 1, delete "one or more or more" and insert -- one or more --

Signed and Sealed this
Second Day of May, 2023

Katherine Kelly Vidal
Director of the United States Patent and Trademark Office